(12) United States Patent
Cihula et al.

(10) Patent No.: US 6,963,873 B2
(45) Date of Patent: Nov. 8, 2005

(54) METHOD AND SYSTEM FOR AUTOMATIC ASSOCIATION OF A SIGNED CERTIFICATE WITH A CERTIFICATE SIGNING REQUEST

(75) Inventors: Joseph F. Cihula, Hillsboro, OR (US); Devendra N. Rath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 10/037,239

(22) Filed: Jan. 2, 2002

(65) Prior Publication Data

US 2003/0126131 A1 Jul. 3, 2003

(51) Int. Cl.[7] .............................................. G06F 17/30
(52) U.S. Cl. ...................... 707/9; 707/3; 707/6; 707/10; 707/102; 709/219; 709/225; 713/201
(58) Field of Search .............................. 707/3, 6, 9, 10, 707/102; 705/26; 709/219, 225, 200, 226, 227; 713/200, 201

(56) References Cited

U.S. PATENT DOCUMENTS

| | | | | |
|---|---|---|---|---|
| 5,560,005 A | * | 9/1996 | Hoover et al. ................. | 707/10 |
| 5,633,929 A | | 5/1997 | Kaliskik, Jr. | |
| 5,724,575 A | * | 3/1998 | Hoover et al. ................. | 707/10 |
| 6,055,636 A | | 4/2000 | Hillier et al. | |
| 6,067,623 A | * | 5/2000 | Blakley et al. ............. | 713/201 |
| 6,108,788 A | | 8/2000 | Moses et al. | |
| 6,134,658 A | | 10/2000 | Multerer et al. | |
| 6,163,776 A | * | 12/2000 | Periwal ........................... | 707/4 |
| 6,304,974 B1 | | 10/2001 | Samar | |
| 6,529,995 B1 | * | 3/2003 | Shepherd ..................... | 711/114 |
| 6,857,009 B1 | * | 2/2005 | Ferreria et al. ............. | 709/219 |

OTHER PUBLICATIONS

Saito, Takamichi et al., "Privacy–enhanced access control by SPKI and its application to Web server", Proeedings of the IEEE 9th International Workshops on Enabling Technologies: Infrastructure for Collaborative Enterprises, Jun. 14–16, 2000, pp. 201–206.*

"HOW TO: Enable SSL for All Customers Who Interact with Your Web Site," Oct. 30, 2001, pp. 1–6, Microsoft, http://support.microsoft.com/support/kb/articles/Q298/8/05.ASP.

The SSL Protocol, Version 3.0, Nov. 1996, pp. 1–63.

ITU–T, X.509, Information Technology—Open Systems Interconnection—The Directory Public–Key and Attribute Certificate Frameworks, Mar. 2000, pp. 1–129.

* cited by examiner

Primary Examiner—Shahid Al Alam
(74) Attorney, Agent, or Firm—Kerry D. Tweet

(57) ABSTRACT

A method and system for automatically associating a signed certificate with its matching certificate signing request. A data structure includes distinguished name data, or other suitable data, for all outstanding certificate signing requests. Distinguished name data, or other suitable data, is extracted or read from the signed certificate and compared against the data structure to identify the matching certificate signing request.

63 Claims, 3 Drawing Sheets

US 6,963,873 B2

METHOD AND SYSTEM FOR AUTOMATIC ASSOCIATION OF A SIGNED CERTIFICATE WITH A CERTIFICATE SIGNING REQUEST

FIELD OF THE INVENTION

The invention relates generally to public-key encryption in a Secure Socket Layer environment and, more particularly, to a method and system for automatically associating a signed certificate received from a certificate authority with a corresponding certificate signing request and key pair.

BACKGROUND OF THE INVENTION

Use of the Internet for business, financial, and other commercial activities has greatly expanded in recent years. These activities often involve the exchange of confidential and sensitive information via the Internet between a server and a client. Due to the sensitive nature of the information being exchanged, electronic transactions between the server—e.g., an application running on the server of a business entity—and the client—e.g., an application running on the computer of an individual—are preferably conducted over a secure connection between the server and client.

Computer networks often implement a Secure Socket Layer (SSL) protocol to provide secure connections between clients and servers. See *Secure Socket Layer Protocol*, Version 3.0, November 1996. The SSL protocol provides an interface between TCP/IP and higher level protocols, such as HTTP. The SSL protocol further defines an SSL handshake protocol for establishing an encrypted SSL connection between a client and server. The SSL handshake protocol provides authentication of the server to the client, selection of a cryptographic algorithm or cipher that both client and server support, optional authentication of the client to the server, and public-key encryption.

As noted above, the SSL handshake protocol utilizes public-key encryption techniques in establishing a secure connection between a client and server, such public-key encryption techniques being well known in the art. Generally, public-key encryption utilizes a public key and an associated private key—or key pair—in conjunction with a certificate. Data encrypted with a public key can be decrypted only with the corresponding private key and, similarly, data encrypted with the private key can be decrypted only with the mating public key. Key pairs are utilized during the initial SSL handshake process to establish a secure, encrypted connection between a client and server, each of which may have a unique key pair (and certificate).

A certificate is an electronic document that identifies an individual or entity and associates the identified individual or entity with a public key. See, e.g., International Telecommunications Union—Telecommunication Standardization Sector (ITU-T) X.509, *Information Technology—Open Systems Interconnection—The Directory: Public Key and Attribute Certificate Frameworks*, March 2000. A certificate is typically obtained from a certificate authority (CA). A CA is an entity that validates the identity of individuals or entities and issues certificates. An issued certificate binds a particular public key to the name (individual or entity) identified by the certificate, and only that public key will function with the corresponding private key possessed by the individual or entity identified by the certificate.

To facilitate Internet-based transactions with their customers, businesses and other entities commonly host a website. For many businesses—as well as for many educational institutions, non-profit institutions, and individuals—it is not cost-effective to manage a server (or, in most instances, a server cluster) and the associated software necessary to maintain a website. Rather, these businesses utilize an Internet Service Provider (ISP) or other service provider to host their website. An ISP may manage the website for each of hundreds of subscribers.

An ISP will typically implement the SSL protocol and public-key encryption (or their equivalents) to provide secure client-server connections and to insure secure Internet-based transactions for their subscribers. To provide this service, the ISP may regularly request certificates for its subscribers (or a subscriber may itself request a certificate). To request a certificate, the ISP will generate a key pair and an associated certificate signing request (CSR), and the CSR is transmitted to the CA. The CA will process the CSR and return a signed certificate (i.e., a certificate including the CA's digital signature). The ISP must then match the signed certificate with the corresponding CSR and key pair used to request the certificate. Once the matching CSR is identified, the signed certificate can be imported to the appropriate subscriber's website.

Presently, a signed certificate received from a CA is manually associated with its mating CSR and key pair. As noted above, however, an ISP may have hundreds of subscribers, and the number of businesses maintaining a presence on the Internet is expected to increase. The next-generation of tools for managing certificates and key pairs will be expected to support thousands of certificates and key pairs. Therefore, as the number of subscribers serviced by an ISP—and, hence, the number of certificates and key pairs—grows, it is believed that the manual association of signed certificates and CSRs will becoming increasingly difficult, if not impossible. Also, there is often a significant time delay (e.g., hours, days) between transmission of a CSR and receipt of a signed certificate from a CA, increasing the difficulty of the manual association process.

DETAILED DESCRIPTION OF THE INVENTION

Figure 1:
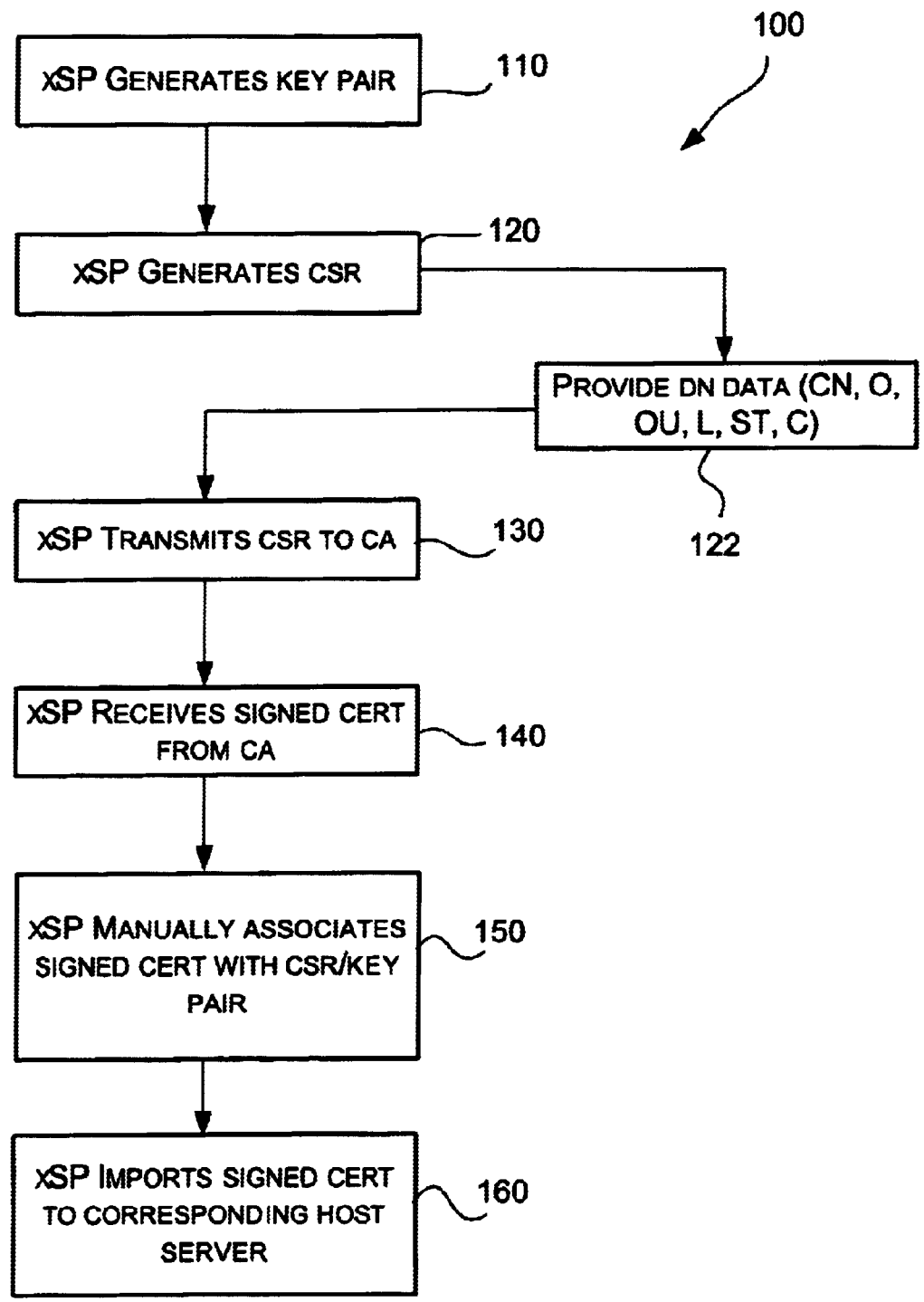
FIG. 1 is a flow chart illustrating a conventional method of manually associating a signed certificate with a certificate signing request.

A conventional method 100 of manually associating a signed certificate with its certificate signing request (CSR) is illustrated in FIG. 1. The method 100 of manually associating signed certificates and CSRs may be performed by any entity or individual, including an Internet Service Provider (ISP), Application Service Provider (ASP), Network Service Provider (NSP), or other service provider. A service provider will be designated generally as an "xSP" and this term, as used herein, makes reference to any type of service provider—such as an ISP, ASP, NSP, or other service provider—as well as any other entity that requests certificates and must associate those certificates with their matching CSR.

Referring to reference numeral 110 in FIG. 1, an xSP generates a key pair and, as denoted at 120, the xSP generates a CSR. The xSP may be maintaining a server, or server cluster, that hosts a website for one of the xSP's subscribers. When the xSP requests a certificate on behalf of the subscriber, the CSR provides to the CA the necessary identification information about the subscriber. To generate the CSR, distinguished name (DN) data for the subscriber is provided—see reference numeral 122—and is included in the CSR. Typically, the DN data is manually entered by a user. The DN data may include a "common name" (CN), an "organization" (O), an "organizational unit" (OU), a "locality" (L), a "state" (ST), and a "country" (C), as well as other data. The common name is usually comprised of the host server name and the domain to which it belongs (e.g., "firstcompany.com"). Generally, the CSR comprises an encrypted text message.

The CSR is then transmitted to the CA, as shown at reference numeral 130. The CA may be an independent third party or, alternatively, the CA may comprise a certificate-issuing entity of the xSP itself. The CA processes the CSR and creates a certificate having the CA's digital signature—i.e., a signed certificate or "signed cert"—the digital signature including the cryptographic algorithm used by the CA to create the signature and a hash, or message digest, of all the data in the certificate that is encrypted with the CA's private key. Referring to reference numeral 140, the xSP subsequently receives the signed certificate from the CA.

The signed certificate received from the CA may comprise any type of certificate, such as, for example, a certificate meeting the ITU-T X.509 standard (i.e., an "X.509 certificate"), as noted above. Typically, a certificate includes a reference to the standard supported by the certificate (e.g., the version of X.509), the certificate's serial number, the identity of the algorithm used by the CA to sign the certificate and the CA's public key, the DN data of the issuing CA, the validity period of the certificate, the DN data of the certificate subject (i.e., the subscriber), and the certificate subject's public key and associated algorithm. A certificate may include other information as well. As used herein, the terms "certificate" and "signed certificate" (or "signed cert") refer to any type of certificate, including X.509 certificates as well as others.

Referring now to reference numeral 150 in FIG. 1, the signed certificate received from the CA is manually associated with the CSR (and key pair) used to request the certificate. The association between the signed certificate and CSR is necessary in order for the xSP to identify the subscriber associated with the signed certificate and, hence, to identify the host server to which the signed certificate is to be downloaded. To make the association between the signed certificate and its mating CSR (and key pair), a person may compare DN data from the CSR with DN information provided by the CA along with the signed certificate. This manual association process is relatively simple when there is only a small number of outstanding CSRs—i.e., a CSR "awaiting" receipt of its corresponding signed certificate from a CA.

As noted above, however, an xSP may serve hundreds of subscribers and, at any given time, the xSP may have hundreds—and, in some instances, thousands—of outstanding CSRs (and key pairs). Comparing the DN data of a signed certificate against the DN data for each of hundreds of outstanding CSRs is an extremely difficult, if not impossible, task for a human to perform. Although a large xSP serving hundreds of subscribers will typically maintain an electronic database of all outstanding CSRs, manually searching this database is a time-consuming process when there is a high influx of signed certificates, as well as a large number of outstanding CSRs.

When the matching CSR and key pair have been identified for a signed certificate, the certificate is imported to a host server—e.g., as identified by the common name of a subscriber in the CSR—corresponding to the matching CSR, as shown at reference numeral 160. Generally, the host server is hosting a website for the subscriber, although a certificate may be downloaded to a server or computer system performing other functions.

Figure 2:
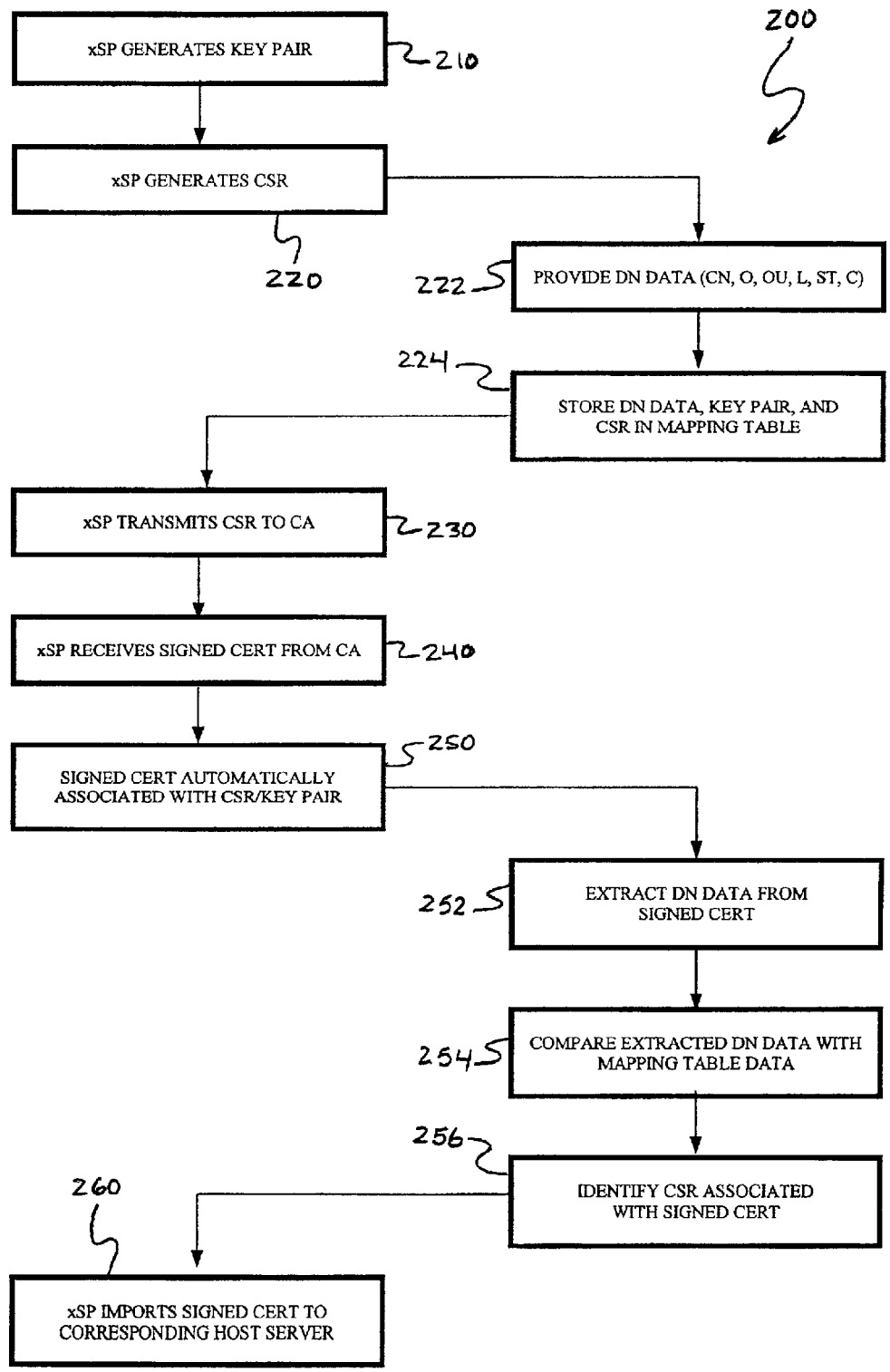
FIG. 2 is a flow chart illustrating a method of automatically associating a signed certificate with a certificate signing request.

A method 200 of automatically associating a signed certificate with its corresponding CSR (and key pair) is illustrated in FIG. 2. It should be understood that, although described in the context of an SSL protocol environment, the disclosed embodiments may be used with any similar type of protocol providing a secure, encrypted connection between a client and server. For example, the method 200 of automatic association of signed certificates and CSRs, as well as the system 300 described below, are believed suitable for a Transport Layer Security protocol environment—see Internet Engineering Task Force Request For Comment (IETF RFC) 2246, *The TLS Protocol*, Version 1.0—as well as an HTTPS (HyperText Transfer Protocol, Secure) protocol environment, respectively. The HTTPS protocol is essentially the SSL protocol underneath the HTTP protocol. See, e.g., IETF RFC 2616, *HyperText Transfer Protocol*, Version 1.1.

Referring to reference numeral 210, an xSP generates a key pair. The xSP may comprise any service provider, such as, by way of example, an ISP, ASP, or NSP, as noted above. It should also be understood that the method 200 of automatically associating signed certificates with CSRs is not limited to any particular public-key cryptography standard, and the key pair may be generated according to any suitable public-key encryption standard or technology.

Referring to reference numeral 220, the xSP generates a CSR. As shown at reference numeral 222, DN data is provided and this DN data is included in the CSR. The DN data may be manually entered into the CSR or, alternatively, the process of entering the DN data into the CSR may be automated. The DN data may include a common name (CN), an organization (O), an organizational unit (OU), a locality (L), a state (ST), and a country (C). The DN data may include only a portion of this data or, alternatively, additional data. It should be understood, however, that data other than the above-described DN data may be provided for inclusion in the CSR, so long as the provided data adequately identifies (for the CA) the corresponding subscriber. As used herein, the terms "DN data" and "distinguished name data" refer to the above-described data (e.g., CN, O, OU, L, ST, C), or a portion thereof, as well as to any other data suitable for identifying a subscriber or other entity.

The DN data is then stored in a mapping table, as shown at 224. The CSR and key pair—or data identifying memory locations of the CSR and key pair—may also be written to the mapping table. The mapping table includes the DN data, as well as the reference to the CSR and key pair, for all outstanding CSRs. The mapping table comprises any suitable data structure that is searchable by DN data, or by other suitable data, such that a signed certificate may be compared with all outstanding CSRs to identify the matching CSR (and key pair) associated with that signed certificate. Generally, the mapping table will include an entry for each outstanding CSR—each entry including the CSR's DN data—and the mapping table comprises a collection of such entries.

Referring to reference numeral 230, the xSP transmits the CSR to a CA. As noted above, a CA may be an independent third party or, alternatively, a CA may comprise a certificate-issuing entity of the xSP itself. The CA will process the CSR and create a signed certificate having the CA's digital signature. Again, the digital signature includes the cryptographic algorithm used by the CA to create the signature and a hash, or message digest, of all the data in the certificate that is encrypted with the CA's private key. The xSP subsequently receives the signed certificate from the CA, as denoted at 240.

The signed certificate received from the CA may comprise any type of certificate, such as, for example, an X.509 certificate, as noted above. Generally, the signed certificate will include a reference to the standard supported by the certificate (e.g., the version of X.509), the certificate's serial number, the identity of the algorithm used by the CA to sign the certificate and the CA's public key, the DN data of the issuing CA, the validity period of the certificate, the DN data of the certificate subject (i.e., the subscriber), and the certificate subject's public key and associated algorithm. The signed certificate may, however, include other information, as desired.

Referring now to reference numeral 250, the signed certificate is automatically associated with its CSR (and key pair). The DN data (or other data) is extracted or read from the signed certificate—see reference numeral 252—and the extracted DN data is compared with the data entries in the mapping table, as shown at 254. Again, each data entry in the mapping table includes the DN data (or other data) for an outstanding CSR. The extracted DN data is compared against the DN data of the outstanding CSRs to identify the CSR (and key pair) associated with the signed certificate, as denoted by reference numeral 256.

When searching the mapping table data to find the associated CSR, all of the extracted DN data may be compared against all of the DN data contained in each entry of the mapping table. Alternatively, only a portion of the extracted DN data is compared with the mapping table data. For example, a search of the mapping table may be conducted, and the matching CSR identified, using only the common name. Other suitable combinations of data may also be employed. By way of example, a search of the mapping table may be performed based upon the common name and organization unit. In a further embodiment, only a portion of the DN data is extracted or read from the signed certificate—see reference numeral 252—and the search of the mapping data performed based upon the extracted portion of DN data. For example, only the common name may be extracted from the signed certificate, the comparison with the mapping table entries then being performed using just the common name. It should be understood that the above-described alternative embodiments may be implemented in combination. For example, a portion (e.g., common name and organization) of the DN data may be read from the signed certificate, and a search performed using only a subset (e.g., common name) of the extracted portion.

Generally, the search of the mapping table data will yield only one matching CSR (and key pair). However, it is possible that a search will return two or more potentially matching CSRs, although the group of potentially matching CSRs will be relatively small in comparison to the total number of outstanding CSRs. Where a search yields a relatively small number of potentially matching CSRs, the correct CSR and key pair may be selected using a manual association process. Alternatively, where an initial search yields a list of potentially matching CSRs, a second search may be performed using additional DN data to narrow down the number of potentially matching CSRs. If necessary, the additional DN data may be extracted from the signed certificate.

Once a signed certificate has been associated with its matching CSR (and key pair), the signed certificate may be imported to a host server of a corresponding subscriber (e.g., as identified by the common name in the CSR), as shown at 260. Alternatively, the signed certificate may be imported to a device that performs SSL processing on behalf of one or more servers. With the signed certificate downloaded to the host server, clients may access the subscribers website and establish a secure connection therewith.

Figure 3:
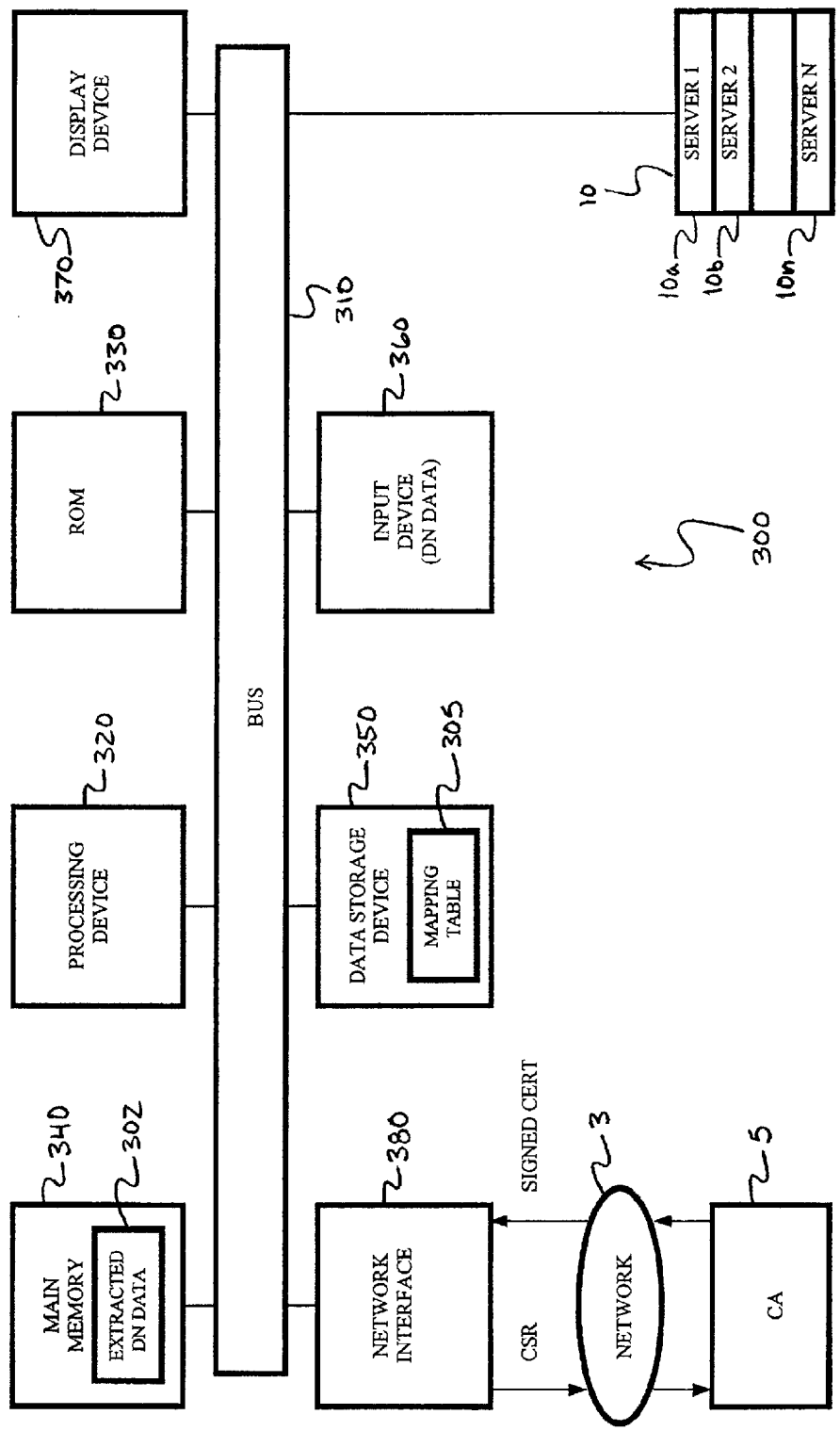
FIG. 3 is a schematic diagram illustrating an exemplary embodiment of a system for implementing the method of automatically associating a signed certificate with a certificate signing request shown in FIG. 2.

Referring now to FIG. 3, an exemplary embodiment of a system 300 for implementing the method 200 of automatically associating a signed certificate with its CSR is illustrated. The system 300 includes a bus 310 having a processing device 320 coupled therewith. The processing device may comprise any microprocessor, ASIC (application specific integrated circuit), or other suitable circuitry. A read-only memory (ROM) 330 may also be coupled with the bus 310. The system 300 also includes a main memory 340 coupled with the bus 310. The main memory 340 comprises, for example, random access memory (RAM) or other suitable memory. Extracted DN data 302—see FIG. 2, reference numeral 252—may be stored in the main memory 340.

A data storage device 350 may also be coupled with the bus 310. The data storage device 350 comprises any suitable non-volatile memory, such as, for example, a hard disk drive, floppy disk drive, or CD-ROM drive. Resident in the data storage device 350 is the mapping table 305—see FIG. 2, reference numerals 224, 254. Alternatively, the mapping table 305 may be stored in main memory 340. The system 300 may further include an input device 360 coupled with the bus 310. The DN data (or other data) may be input—see FIG. 2, reference numeral 222—to the system 300 via the input device 360. Common input devices 360 include keyboards, pointing devices such as a mouse, and scanners or other data entry devices. An output device 370, such as, for example, a video monitor, may also be coupled with the bus 310.

The system 300 may be coupled with a network 3 by a network interface 380. The network interface 380 may be coupled with any type of network 3—including the Internet, a wide area network (WAN), a metropolitan area network (MAN), a local area network (LAN), or a system area network (SAN)—exhibiting any suitable network architecture. The network interface 380 provides an interface between the network 3 and the system 300, such that the system 300 may communicate with a CA 5 also coupled with the network 3. The system 300 may transmit a CSR to the CA 5, and receive a signed certificate from the CA 5, via the network interface 380 and network 3. It should be understood, however, that the system 300 may not include such a network interface, in which case alternative modes (e.g., a CSR or signed certificate may be downloaded onto a floppy disk or other media and transmitted via mail or other courier service) of communication between an xSP and CA may be used.

The system 300 may also be coupled with a server or server cluster 10, which may include servers 10a, 10b, . . . , 10n. Although illustrated as being coupled with the bus 310, the server cluster 10 may be coupled with the system 300 via a network, such as an LAN or SAN. The server cluster 10 may host a website (or websites) for one or more subscribers of an xSP.

When a signed certificate is received from the CA 5, the system 300—acting under control of processing device 320 executing instructions stored in main memory 340 and/or ROM 330—may perform the above-described method 200 to automatically associate the signed certificate with its mating CSR (and key pair). The DN data 302, or a portion thereof, may be extracted or read from the signed certificate and stored in the main memory 340, or other memory. The extracted DN data 302, or a portion thereof, is compared against the data entries of the mapping table 305 stored in data storage device 350, or other suitable memory device. When the matching CSR and key pair are identified—and, hence, the server 10 corresponding to the matching CSR and key pair known—the signed certificate may be imported to the corresponding server 10 (or to a device performing SSL processing for the server 10).

Embodiments of a method 200 of automatically associating signed certificates and CSRs—as well as a system 300 for implementing such a method—having been herein described, those of ordinary skill in the art will appreciate the advantages thereof. A signed certificate may be received and automatically compared with hundreds, or even thousands, of outstanding CSRs to quickly identify the CSR and key pair associated with the signed certificate, thereby eliminating the need for an operator to manually search a CSR database. Distinguished name data (or other suitable data) extracted or read from the signed certificate is compared against data entries in a mapping table—each entry including the DN data (or other suitable data) for an outstanding CSR—to identify the matching CSR. Only a portion of the DN data may be extracted from the signed certificate and/or only a portion of the extracted DN data may be utilized when searching the mapping table.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A computer implemented method comprising:
   reading distinguished name data from a signed certificate received from a certificate authority, the signed certificate received in response to a certificate signing request provided to the certificate authority, the certificate signing request validating an identity to the certificate authority; and
   searching a data structure to identify the certificate signing request associated with the signed certificate, the identified certificate signing request corresponding to the read distinguished name data.

2. The method of claim 1, further comprising identifying a key pair associated with the signed certificate.

3. The method of claim 1, the read distinguished name data comprising all of the distinguished name data contained in the signed certificate.

4. The method of claim 1, the identified certificate signing request corresponding to a portion of the read distinguished name data.

5. The method of claim 1, further comprising importing the signed certificate to a server associated with the identified certificate signing request.

6. The method of claim 5, wherein the signed certificate is imported to a device that performs SSL processing on behalf of the server.

7. The method of claim 1, further comprising identifying at least two certificate signing requests associated with the signed certificate.

8. A computer implemented method comprising:
   providing a mapping table including distinguished name data for each of a plurality of certificate signing requests, each certificate signing request validating an identity;
   extracting distinguished name data from a signed certificate received from a certificate authority; and
   comparing the extracted distinguished name data with the mapping table data to identify a certificate signing request associated with the signed certificate from the plurality of certificate signing requests.

9. The method of claim 8, the mapping table including at least a common name for each of the plurality of certificate signing requests.

10. The method of claim 8, the extracted distinguished name data comprising all of the distinguished name data contained in the signed certificate.

11. The method of claim 8, the extracted distinguished name data comprising a common name.

12. The method of claim 8, further comprising comparing a portion of the extracted distinguished name data with a portion of the distinguished name data of each certificate signing request contained in the mapping table to identify the certificate signing request associated with the signed certificate.

13. The method of claim 12, the portion of the extracted distinguished name data comprising a common name.

14. The method of claim 8, further comprising:
   comparing the extracted distinguished name data with the mapping table data to identify at least two certificate signing requests from the plurality of certificate signing requests; and
   determining which of the at least two certificate signing requests is associated with the signed certificate.

15. The method of claim 14, further comprising performing a second search of the mapping table data to determine which of the at least two certificate signing requests is associated with the signed certificate.

16. The method of claim 8, further comprising importing the signed certificate to a server associated with the identified certificate signing request.

17. The method of claim 16, wherein the signed certificate is imported to a device that performs SSL processing on behalf of the server.

18. The method of claim 8, further comprising identifying at least two certificate signing requests associated with the signed certificate.

19. A computer implemented method comprising:
   generating a certificate signing request, the certificate signing request including distinguished name data;
   storing the distinguished name data in a mapping table;
   transmitting the certificate signing request to a certificate authority, the certificate signing request validating an identity to the certificate authority;
   receiving a signed certificate from the certificate authority, the signed certificate including distinguished name data;
   extracting the distinguished name data from the signed certificate; and
   comparing the extracted distinguished name data with the stored distinguished name data contained in the mapping table to identify the certificate signing request.

20. The method of claim 19, the stored distinguished name data comprising all of the distinguished name data contained in the certificate signing request.

21. The method of claim 19, the stored distinguished name data comprising a common name.

22. The method of claim 19, further comprising comparing a portion of the extracted distinguished name data with a portion of the stored distinguished name data.

23. The method of claim 19, further comprising comparing a common name contained in the extracted distinguished name data with a common name contained in the stored distinguished name data.

24. The method of claim 19, the extracted distinguished name data comprising all of the distinguished name data contained in the signed certificate.

25. The method of claim 19, the extracted distinguished name data comprising a common name.

26. The method of claim 19, further comprising:

generating a key pair associated with the certificate signing request; and identifying the key pair when comparing the extracted distinguished name data with the stored distinguished name data.

27. The method of claim 19, further comprising importing the signed certificate to a server associated with the certificate signing request.

28. The method of claim 19, further comprising importing the signed certificate to an SSL processing device.

29. A computer system comprising:

a memory coupled with a bus, the memory having a mapping table resident thereon; and a processing device coupled with the bus, the processing device programmed to perform operations including reading distinguished name data from a signed certificate received from a certificate authority, the signed certificate received in response to a certificate signing request provided to the certificate authority, the certificate signing request validating an identity to the certificate authority, and searching the mapping table to identify certificate signing request associated with the signed certificate, the identified certificate signing request corresponding to the read distinguished name data.

30. The computer system of claim 29, wherein the processing device is programmed to perform operations further including identifying a key pair associated with the signed certificate.

31. The computer system of claim 29, the read distinguished name data comprising all of the distinguished name data contained in the signed certificate.

32. The computer system of claim 29, the identified certificate signing request corresponding to a portion of the read distinguished name data.

33. The computer system of claim 29, the memory comprising a non-volatile data storage device.

34. The computer system of claim 29, wherein a plurality of servers are coupled with the bus, and the processing device is programmed to perform operations further including downloading the signed certificate to a selected server of the plurality of servers, the selected server associated with the identified certificate signing request.

35. The computer system of claim 29, wherein an SSL processing device is coupled with the bus, and the processing device is programmed to perform operations further including downloading the signed certificate to the SSL processing device.

36. An article of manufacture comprising:

a computer readable medium providing content that, when accessed by a computer, causes the computer to read distinguished name data from a signed certificate received from a certificate authority, the signed certificate received in response to a certificate signing request provided to the certificate authority, the certificate signing request validating an identity to the certificate authority; and search a data structure to identify the certificate signing request associated with the signed certificate, the identified certificate signing request corresponding to the read distinguished name data.

37. The article of manufacture of claim 36, wherein the content, when accessed, further causes the computer to identify a key pair associated with the signed certificate.

38. The article of manufacture of claim 36, the read distinguished name data comprising all of the distinguished name data contained in the signed certificate.

39. The article of manufacture of claim 36, the identified certificate signing request corresponding to a portion of the read distinguished name data.

40. The article of manufacture of claim 36, wherein the content, when accessed, further causes the computer to import the signed certificate to a server associated with the identified certificate signing request.

41. The article of manufacture of claim 40, wherein the content, when accessed, further causes the computer to import the signed certificate to a device that performs SSL processing on behalf of the server.

42. The article of manufacture of claim 36, wherein the content, when accessed, further causes the computer to identify at least two certificate signing requests associated with the signed certificate.

43. An article of manufacture comprising:

a computer readable medium providing content that, when accessed by a computer, causes the computer to provide a mapping table including distinguished name data for each of a plurality of certificate signing requests, each certificate signing request validating an identity;

extract distinguished name data from a signed certificate received from a certificate authority; and compare the extracted distinguished name data with the mapping table data to identify a certificate signing request associated with the signed certificate from the plurality of certificate signing requests.

44. The article of manufacture of claim 43, the mapping table including at least a common name for each of the plurality of certificate signing requests.

45. The article of manufacture of claim 43, the extracted distinguished name data comprising all of the distinguished name data contained in the signed certificate.

46. The article of manufacture of claim 43, the extracted distinguished name data comprising a common name.

47. The article of manufacture of claim 43, wherein the content, when accessed, further causes the computer to compare a portion of the extracted distinguished name data with a portion of the distinguished name data of each certificate signing request contained in the mapping table to identify the certificate signing request associated with the signed certificate.

48. The article of manufacture of claim 47, the portion of the extracted distinguished name data comprising a common name.

49. The article of manufacture of claim 43, wherein the content, when accessed, further causes the computer to:

compare the extracted distinguished name data with the mapping table data to identify at least two certificate signing requests from the plurality of certificate signing requests; and determine which of the at least two certificate signing requests is associated with the signed certificate.

50. The article of manufacture of claim 49, wherein the content, when accessed, further causes the computer to perform a second search of the mapping table data to determine which of the at least two certificate signing requests is associated with the signed certificate.

51. The article of manufacture of claim 43, wherein the content, when accessed, further causes the computer to import the signed certificate to a server associated with the identified certificate signing request.

52. The article of manufacture of claim 51, wherein the content, when accessed, further causes the computer to import the signed certificate to a device that performs SSL processing on behalf of the server.

53. The method of claim 43, wherein the content, when accessed, further causes the computer to identify at least two certificate signing requests associated with the signed certificate.

54. An article of manufacture comprising:
   a computer readable medium providing content that, when accessed by a computer, causes the computer to
   generate a certificate signing request, the certificate signing request including distinguished name data;
   store the distinguished name data in a mapping table;
   transmit the certificate signing request to a certificate authority, the certificate signing request validating an identity to the certificate authority;
   receive a signed certificate from the certificate authority, the signed certificate including distinguished name data;
   extract the distinguished name data from the signed certificate; and
   compare the extracted distinguished name data with the stored distinguished name data contained in the mapping table to identify the certificate signing request.

55. The article of manufacture of claim 54, the stored distinguished name data comprising all of the distinguished name data contained in the certificate signing request.

56. The article of manufacture of claim 54, the stored distinguished name data comprising a common name.

57. The article of manufacture of claim 54, wherein the content, when accessed, further causes the computer to compare a portion of the extracted distinguished name data with a portion of the stored distinguished name data.

58. The article of manufacture of claim 54, wherein the content, when accessed, further causes the computer to compare a common name contained in the extracted distinguished name data with a common name contained in the stored distinguished name data.

59. The article of manufacture of claim 54, the extracted distinguished name data comprising all of the distinguished name data contained in the signed certificate.

60. The article of manufacture of claim 54, the extracted distinguished name data comprising a common name.

61. The article of manufacture of claim 54, wherein the content, when accessed, further causes the computer to:
   generate a key pair associated with the certificate signing request; and
   identify the key pair when comparing the extracted distinguished name data with the stored distinguished name data.

62. The article of manufacture of claim 54, wherein the content, when accessed, further causes the computer to import the signed certificate to a server associated with the certificate signing request.

63. The article of manufacture of claim 54, wherein the content, when accessed, further causes the computer to import the signed certificate to an SSL processing device.

* * * * *